United States Patent [19]
Pla et al.

[11] Patent Number: 5,391,053
[45] Date of Patent: Feb. 21, 1995

[54] ACTIVE NOISE CONTROL USING NOISE SOURCE HAVING ADAPTIVE RESONANT FREQUENCY TUNING THROUGH VARIABLE PANEL LOADING

[75] Inventors: Frederic G. Pla, Schenectady; Harindra Rajivah, Clifton Park; Anthony A. Renshaw, Albany; Robert A. Hedeen, Clifton Park, all of N.Y.

[73] Assignee: General Electric Company, Schenectady, N.Y.

[21] Appl. No.: 143,604

[22] Filed: Nov. 1, 1993

[51] Int. Cl.⁶ ............................................. F01D 25/00
[52] U.S. Cl. ..................................... 415/119; 381/71; 244/1 N; 340/388.1
[58] Field of Search ................ 415/118, 119; 181/206; 381/64, 71; 244/1 N; 340/388.1, 388.3

[56] References Cited

U.S. PATENT DOCUMENTS

| | | | |
|---|---|---|---|
| 3,693,749 | 9/1972 | Motsinger et al. | 181/206 |
| 3,936,606 | 2/1976 | Wanke | 415/119 |
| 3,991,849 | 11/1976 | Green et al. | 415/119 |
| 4,044,203 | 8/1977 | Swinbanks | |
| 4,199,295 | 4/1980 | Raffy et al. | 415/119 |
| 4,255,083 | 3/1981 | Andre et al. | 415/119 |
| 4,689,821 | 8/1987 | Salikuddin et al. | |
| 4,700,177 | 10/1987 | Nakashima et al. | |
| 4,715,559 | 12/1987 | Fuller | |
| 4,947,356 | 8/1990 | Elliott et al. | |
| 4,947,434 | 8/1990 | Ito | |
| 4,967,550 | 11/1990 | Acton et al. | 60/39.29 |
| 5,031,222 | 7/1991 | Takaya | |
| 5,060,471 | 10/1991 | Torkelson | 415/119 |

FOREIGN PATENT DOCUMENTS

| | | | |
|---|---|---|---|
| 587999 | 1/1983 | Japan | |
| 159406 | 6/1989 | Japan | 415/119 |
| 124598 | 5/1990 | Japan | 340/388.1 |
| 47200 | 2/1992 | Japan | 415/119 |

OTHER PUBLICATIONS

Elliott et al., "A Multiple Error LMS Algorithm and Its Application to the Active Control of Sound and Vibration," IEEE Transactions on Acoustics, Speech, and Signal Processing, vol. ASSP-35, No. 10, Oct. 1987, pp. 1423–1434.

*Primary Examiner*—Edward K. Look
*Assistant Examiner*—James A. Larson
*Attorney, Agent, or Firm*—Patrick R. Scanlon; Paul R. Webb, II

[57] ABSTRACT

A noise source for an aircraft engine active noise cancellation system in which the resonant frequency of a noise radiating element is tuned to permit noise cancellation over a wide range of frequencies. The resonant frequency is tuned by adjusting the size of a frame which encloses the noise radiating element. One or more expandable elements are disposed in the frame to produce expansion and contraction of the frame. The elements are actuated by a controller which receives input of a feedback signal proportional to displacement of the noise radiating element and a signal corresponding to the blade passage frequency of the engine's fan. In response, the controller determines a control signal which is sent to the elements and causes the frame to expand or contract.

22 Claims, 3 Drawing Sheets

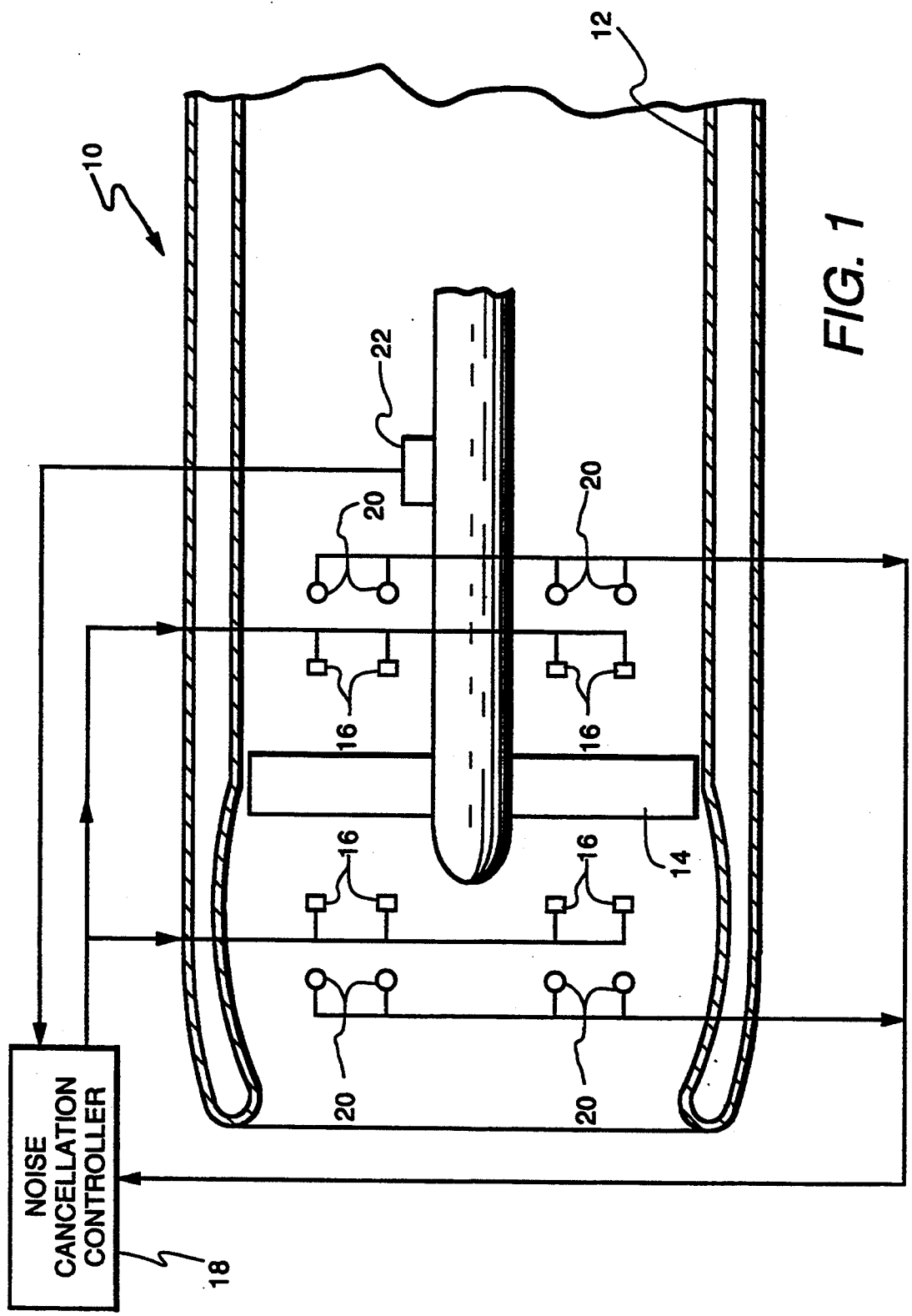

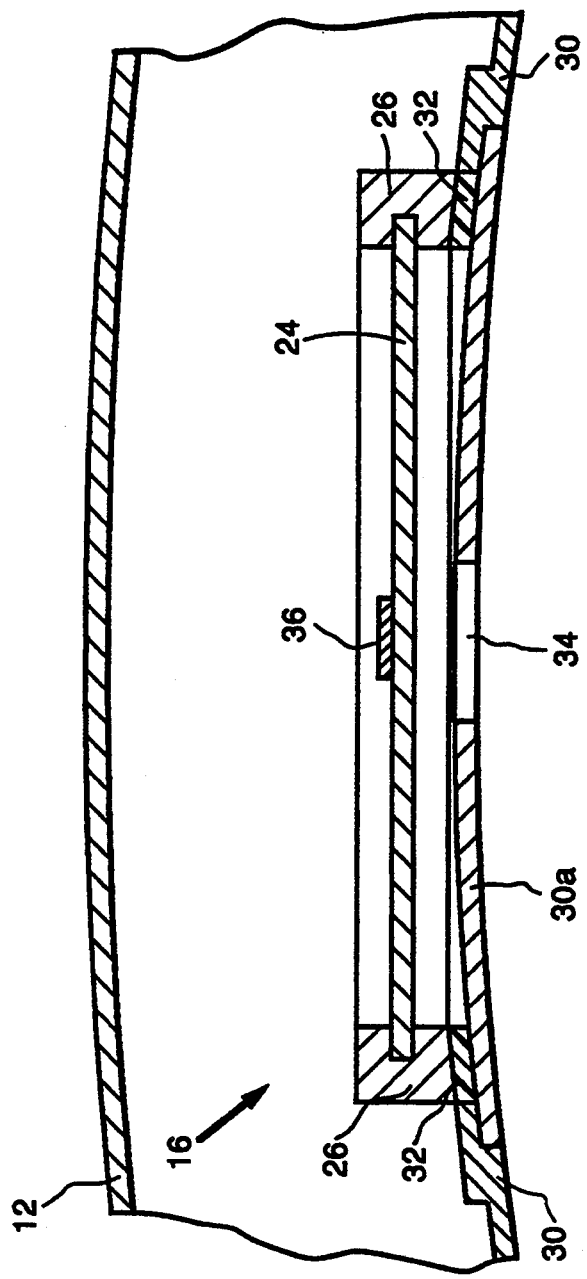

ACTIVE NOISE CONTROL USING NOISE SOURCE HAVING ADAPTIVE RESONANT FREQUENCY TUNING THROUGH VARIABLE PANEL LOADING

CROSS REFERENCE TO RELATED APPLICATIONS

This application is related to the following copending applications: "Active Noise Control Using Noise Source Having Adaptive Resonant Frequency Tuning Through Stiffness Variation," Ser. No. 08/143,602, "Active Noise Control Using Noise Source Having Adaptive Resonant Frequency Tuning Through Stress Variation," Ser. No. 08/143,605, and "Active Noise Control Using Noise Source Having Adaptive Resonant Frequency Tuning Through Variable Ring Loading," Ser. No. 08/143,603. All of these related copending applications are filed concurrently herewith and assigned to the same assignee as the present invention.

BACKGROUND OF THE INVENTION

The U.S. Government has rights in this invention as provided for by the terms of contract No. NAS3-26617 awarded by the National Aeronautics and Space Administration (NASA).

This invention relates generally to reducing aircraft engine noise with a cancellation noise field which is generated by vibrational inputs to noise radiating structures and more particularly concerns changing the boundary conditions of the noise radiating structures to produce adaptive tuning of the resonant frequency of the structures.

Excessive noise has always been a problem confronting the aviation industry. Noise from discrete tones generated by the fans and turbines of modern aircraft engines is a major source of the noise problems. This is particularly true in communities surrounding airports which are subjected to the noise of take off and landing operations. Lately, fan and turbine noise has become an even larger issue due to the louder fan noise of the large-thrust high bypass engines and the increased enactment and enforcement of strict community anti-noise regulations.

Turbine and fan noise has been addressed for many years by employing passive techniques such as noise absorbing liners, tuned resonators, or a combination thereof. Such devices are usually mounted at the inlet and outlet of the engine to reduce noise radiated from the engine. Some disadvantages associated with these passive techniques include added weight and decreased thrust. Also, absorbent liners are generally ineffective against the long wavelengths of low frequency noise, and tuned resonators are only useful at the frequency to which they are tuned.

One possible active approach to fan and turbine noise control is to cancel the noise using secondary or cancelling noise fields generated with acoustical inputs. The cancelling noise field, which is of equal amplitude but 180° out-of-phase with the primary field, destructively interferes with and cancels the primary field. However, standard acoustical inputs, such as loudspeakers, are expensive, fragile, heavy and require a relatively large amount of power. An alternative to acoustical inputs is disclosed in the copending application entitled "Active Control of Aircraft Engine Noise Using Vibrational Inputs," Ser. No. 08/051,810, filed Apr. 21, 1993 which is a File Wrapper Continuation of application Ser. No. 07/787,471, filed Nov. 4, 1991 and assigned to the same assignee as the present invention. Application Ser. No. 08/051,810 discloses using piezoceramic actuators instead of acoustical inputs to generate the cancelling noise field. The actuators are mounted either directly to an inner surface of an aircraft engine or to noise radiating elements resiliently mounted to the inner surface. When excited, the actuators produce vibrations in their supporting structure (the noise radiating elements or the engine itself) which "shake" the structure so that it generates the cancelling noise field.

The supporting structure which is shaken by the piezoceramic actuators may be made of low-damping materials because the peak vibratory response at resonance of elements fabricated with low-damping materials is very high and produces a correspondingly high acoustic output which is needed to cancel the engine noise. However, the off-resonance vibratory response of elements fabricated with low-damping materials is very low and does not result in an acoustic output sufficient to cancel engine noise. Thus, such piezoceramic-actuated noise cancellation is only effective over a narrow frequency range. Cancellation of aircraft engine noise is often required over a wider range of frequencies.

Accordingly, there is a need for an active noise cancellation system which is effective over a wide frequency range.

SUMMARY OF THE INVENTION

The above-mentioned needs are met by the present invention in which the cancelling sound field is generated using noise radiating elements which are vibrated by actuators mounted thereon. To accomplish noise cancellation over a wide range of frequencies, the structural resonant frequency of the noise radiating elements is tuned by adaptively changing their structural and traction boundary conditions. Changing an element's boundary conditions (such as torsional or linear stiffness, or compressive or tensile loading) will alter its resonant frequency.

Specifically, the present invention provides a noise source for an active noise cancellation system which comprises a noise radiating element enclosed in a frame. One or more expandable elements are disposed in the frame to produce expansion and contraction of the frame, thereby tuning the resonant frequency of the noise radiating element. The elements are actuated by a controller which receives input of a feedback signal proportional to displacement of the noise radiating element and a signal corresponding to the blade passage frequency of the engine's fan. In response, the controller determines a control signal which is sent to the elements and causes the frame to expand or contract. An actuator is provided to induce vibrations in the noise radiating element.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 1 shows a schematic, cross-sectional view of an aircraft engine incorporating the active noise cancellation system of the present invention;

FIG. 3 is a partial, cross-sectional end view showing the first embodiment of the noise source of the present invention in detail.

DETAILED DESCRIPTION OF THE INVENTION

Figure 4:
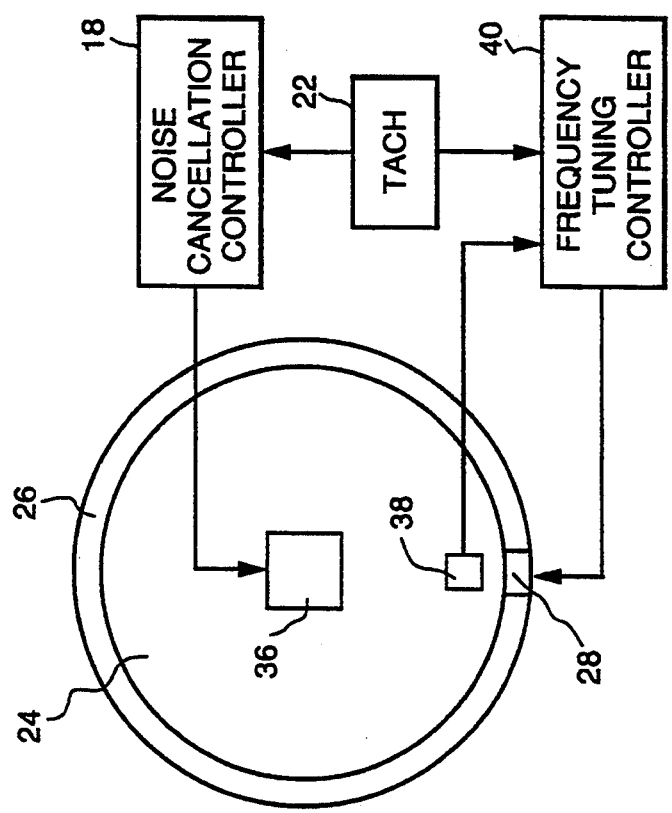
FIG. 4 schematically shows a second embodiment of the noise source of the present invention.

Referring to the drawings wherein identical reference numerals denote the same elements throughout the various views, FIG. 1 schematically shows the active noise cancellation system of the present invention as implemented in an aircraft engine 10. The engine 10, which in itself does not form a part of the present invention, can be any typical turbine- or fan-driven aircraft engine. The engine 10 includes an outer shroud 12 and a fan 14. For the sake of clarity, the other parts of the engine 10 are not shown.

In the present invention, noise sources 16 are provided to generate a secondary or cancelling noise field which destructively interferes with the primary noise field of the engine 10. FIG. 1 schematically shows a plurality of noise sources 16 mounted in the inner surface of the engine shroud 12. The size of the noise sources 16 depends on the acoustic power required to produce the secondary sound field. The number and placement of the noise sources 16 depends mainly on the modal order of the primary noise field to be cancelled. Ideally, a number of noise sources 16 will be distributed around the periphery of the engine shroud 12 in a cross-sectional plane to define a "ring source." One or more ring sources may be located both upstream and downstream of the fan 14. A plurality of ring sources, each designed for a different noise bandwidth, can be used for cancellation of multiple tones.

The noise sources 16 are controlled by a noise cancellation controller 18 connected to each of the noise sources. The controller 18 receives input from a plurality of noise transducers 20 and a tachometer 22. The transducers 20 sense noise generated by the engine 10 and produce an error signal corresponding to the level of noise sensed. The noise transducers 20 can be microphones, piezoelectric transducers or any other type of device capable of sensing noise and producing an electrical signal output thereof. The transducers 20 are generally located near to wherever noise is believed to emanate from. Preferably, an array of noise transducers 20 is located upstream of the fan 14 and another array is located downstream of the fan 14, as shown in FIG. 1. The tachometer 22 inputs the blade passage frequency of the fan 14 into the controller 18. In response to the inputs from the noise transducers 20 and the tachometer 22, the controller 18 determines an appropriate control signal which is sent to each of the noise sources 16. The control signal causes the noise sources 16 to vibrate with the frequency and amplitude needed to create the proper secondary noise field for minimizing total noise.

The controller 18 can be implemented using one of a variety of standard control schemes known in the art. One preferred scheme uses a multi-input, multi-output (MI/MO) adaptive filtering approach based on the MI/MO Filtered-X LMS algorithm. Such an algorithm is described in the article "A Multiple Error LMS Algorithm and its Application to the Active Control of Sound and Vibration," *IEEE Transactions on Acoustic Speech and Signal Processing*, Vol. ASSP-35, No. 10, October, 1987, by Stephen Elliott et al. In such a control scheme, the control signals which are sent to the noise sources 16 are adjusted in real time to minimize noise at the noise transducers 20. The controller 18 can react nearly instantly to any change in the RPM of the fan 14. Moreover, due to its adaptive nature, the controller 18 is self-configuring and can self-adapt to changes in the system such as noise source or transducer failure.

Figure 2:
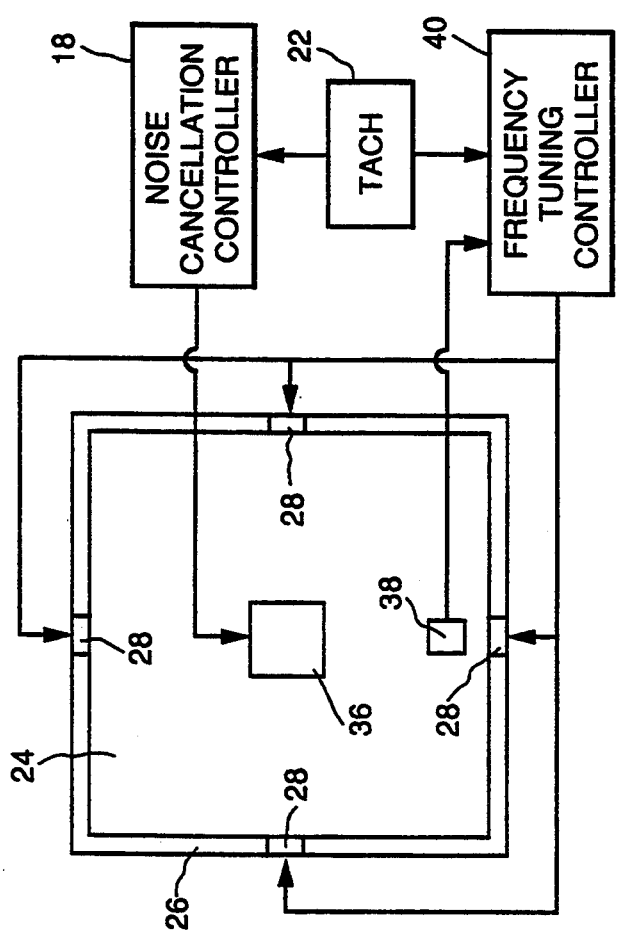
FIG. 2 schematically shows a first embodiment of the noise source of the present invention.

Turning to FIGS. 2 and 3, a first embodiment of a noise source 16 is shown in detail. The noise source 16 comprises a noise radiating element 24 which is a relatively thin, rectangular panel of a lightly damped material such as aluminum. The noise radiating element 24 is enclosed by a rectangular frame 26 and is mounted to the frame 26 such that there is no slippage therebetween. Preferably, the noise radiating element 24 is attached to the frame 26 at each of the four corners. An expandable element 28 is disposed in each of the four sides of the frame 26. The elements 28 can comprise piezoceramic, electrostrictive or magnetostrictive materials or can comprise electromechanical devices. Excitation of the elements 28 with a DC voltage will cause the frame 26 to expand or contract depending on the direction of the applied voltage.

The frame 26 is mounted to the inner wall 30 of the shroud 12 by a number of resilient mounting members 32. The resilient mounting members 32 are attached to a portion 30a of the inner wall 30; the inner wall portion 30a is flush with the inner wall 30 and may be a separate plate removably attached to the inner wall 30 in order to permit access to the noise source 16. The resilient mounting members 32 are preferably elastic members which allow the frame 26 to expand and contract and prevent noise generating vibrations of the noise source 16 from propagating to the critical parts of the engine 10. The noise source 16 is disposed in the hollow interior of the engine shroud 12 so as to be out of the main flow of the engine 10. This arrangement assures that the noise controlling structure does not interfere with engine performance. A sound port 34 is formed in the inner wall portion 30a to permit the cancelling noise field generated by the noise source 16 to be transmitted into the engine interior. The sound port 34 is preferably covered with a mesh or similar structure to prevent ingress of foreign materials.

The frame 26 supports the noise radiating element 24 in a manner which permits the noise radiating element 24 to vibrate. Vibration of the noise radiating element 24 is produced by an actuator 36 which is connected to the noise cancellation controller 18. The actuator 36 is preferably a thin sheet of piezoceramic, electrostrictive or magnetostrictive material disposed flat on the noise radiating element 24. The thin sheet exerts an oscillating force in the plane of the noise radiating element 24 when excited by the control signal sent from the controller 18. Structure-borne noise is then generated when in-plane vibrations change the shape of the noise radiating element 24 and produce bending motions. The highest, and thus most effective, acoustic output is achieved when the noise radiating element 24 is vibrated at one of its natural resonant frequencies.

In the present invention, the resonant frequency of the noise radiating element 24 is adaptively tuned by changing its structural and traction boundary conditions, thereby providing effective noise cancellation over a wider frequency range. This is accomplished by applying a DC signal to the elements 28 which causes the frame 26 to expand or contract, depending on the direction of the applied signal. Expansion or contraction of the frame 26 will produce a corresponding change in the in-plane tensile or compressive loading on the noise radiating element 24, thereby changing its resonant frequency. While the noise radiating element 24 can be precompressed or pretensioned, the present invention is particularly effective when the noise radiating element 24 is precompressed in the frame 26 so that expansion of the frame 26 will lessen the compression of the noise radiating element 24 and contraction of the frame 26 will increase the compression.

A feedback sensor 38 is optionally disposed on the noise radiating element 24. The feedback sensor 38 can be any type of device which produces a signal that is proportional to the displacement (as well as the velocity or acceleration) of the noise radiating element 24. Suitable devices include an accelerometer, a strain gauge or a patch of piezoceramic material. The feedback signal produced by the feedback sensor 38 is fed to a frequency tuning controller 40. The tuning controller 40 also receives input of the blade passage frequency from the tachometer 22. In response to these inputs, the controller 40 determines appropriate control signals (the DC signals described above) which are sent to the elements 28. The tuning controller 40 is implemented using a control scheme in which the gain is adjusted in accordance with the inputted blade passage frequency.

In operation, the control signals applied to the elements 28 cause appropriate displacements in the elements 28. These displacements cause the frame 26 to either expand or contract, thereby changing the tensile or compressive loading of the noise radiating element 24. This tunes the resonant frequency of the noise radiating element 24 so that it tracks the blade passage frequency of the fan 14. The noise cancellation controller 18 then sends control signals to the actuator 36 which cause the noise radiating element 24 to vibrate at resonance and generate a noise field which tends to cancel the primary field produced by the engine 10.

The present invention is not limited to the rectangular configuration described above. Other shapes, such as circles, ovals or non-rectangular polygons, can also be utilized. FIG. 4 shows a second embodiment of the noise source 16 in which the noise radiating element 24 is a thin, circular panel instead of being rectangular. The frame 26 of the FIG. 4 embodiment is accordingly circular as well. An expandable element 28 is disposed in the frame 26. Because the circular frame 26 has a continuous periphery, a single element 28 is sufficient to produce a uniform change in the tensile or compressive loading on the noise radiating element 24. However, more elements 28 can be utilized if larger displacements are desired.

The remaining elements of the second embodiment are the same as those in the first embodiment and function in the same manner. Thus, the feedback sensor 38 is disposed on the noise radiating element 24 and sends a feedback signal to the tuning controller 40. In response to the feedback signal and the blade passage frequency input from the tachometer 22, the controller 40 determines appropriate control signals which are sent to the element 28. The control signals cause appropriate displacements in the element 28. This displacement causes the frame 26 to expand or contract, thereby changing the tensile or compressive loading of the noise radiating element 24. This tunes the resonant frequency of the noise radiating element 24 so that it tracks the blade passage frequency of the fan 14. The noise cancellation controller 18 then sends control signals to the actuator 36 which cause the noise radiating element 24 to vibrate at resonance and generate a noise field which tends to cancel the primary field produced by the engine 10.

The foregoing has described an active noise control system in which the cancelling noise is generated through vibrational inputs to noise radiating elements which have adaptively changing boundary conditions to allow adaptive tuning of the resonant frequency of the noise radiating elements for maximum efficiency. Although the present invention has been described primarily for use with an aircraft engine, the invention can be used in almost any device where high-order acoustic modes propagating down a waveguide are to be eliminated. Examples of such devices include heat, ventilation, and air conditioning (HVAC) systems and turbine devices.

While specific embodiments of the present invention have been described, it will be apparent to those skilled in the art that various modifications thereto can be made without departing from the spirit and scope of the invention as defined in the appended claims.

What is claimed is:

1. A noise source for use in an active noise cancellation system which minimizes noise emanating from an aircraft engine having an outer shroud and a fan, said noise source comprising:
    a noise radiating element;
    a frame enclosing said noise radiating element, said frame being mounted to said outer shroud;
    means for expanding and contracting said frame;
    means for producing a blade passage frequency signal corresponding to the blade passage frequency of said fan; and
    a controller having an input connected to said means for producing a blade passage frequency signal and an output connected to said means for expanding and contracting said frame, said controller being responsive to said blade passage frequency signal to determine a control signal which is sent to said means for expanding and contracting said frame, said control signal causing said means for expanding and contracting said frame to change the size of said frame.

2. The noise source of claim 1 further comprising a sensor disposed on said noise radiating element, said sensor producing a feedback signal proportional to displacement of said noise radiating element, said controller having another input connected to said sensor.

3. The noise source of claim 1 wherein said means for expanding and contracting said frame comprises an expandable element disposed in said frame.

4. The noise source of claim 1 wherein said noise radiating element and said frame are rectangular.

5. The noise source of claim 4 wherein said means for expanding and contracting said frame comprises an expandable element disposed in each side of said rectangular frame.

6. The noise source of claim 1 wherein said noise radiating element and said frame are circular.

7. The noise source of claim 1 wherein said frame is resiliently mounted to said outer shroud.

8. The noise source of claim 1 further comprising an actuator disposed on said noise radiating element.

9. An apparatus for minimizing noise emanating from an aircraft engine which has an outer shroud and a fan, said apparatus comprising:
   at least one noise radiating element;
   a frame enclosing said noise radiating element, said frame being mounted to said outer shroud;
   means for expanding and contracting said frame;
   means for producing a blade passage frequency signal corresponding to the blade passage frequency of said fan;
   a frequency tuning controller having an input connected to said means for producing a blade passage frequency signal and an output connected to said means for expanding and contracting said frame, said frequency tuning controller being responsive to said blade passage frequency signal to determine a frequency control signal which is sent to said means for expanding and contracting said frame, said frequency control signal causing said means for expanding and contracting said frame to change the size of said frame;
   means for sensing noise generated by said engine, said means for sensing noise producing an error signal corresponding to the level of noise sensed; and
   a noise cancellation controller having an input connected to said means for sensing noise, another input connected to said means for producing a blade passage frequency signal, and an output connected to said noise radiating element, said noise cancellation controller being responsive to said error signal and said blade passage frequency signal to determine a noise control signal which is sent to said noise radiating element, said noise control signal causing said noise radiating element to generate a noise field which minimizes the total noise emanating from said engine.

10. The apparatus of claim 9 further comprising a sensor disposed on said noise radiating element, said sensor producing a feedback signal proportional to displacement of said noise radiating element, said frequency tuning controller having another input connected to said sensor.

11. The apparatus of claim 9 wherein said means for expanding and contracting said frame comprises an expandable element disposed in said frame.

12. The apparatus of claim 9 wherein said noise radiating element and said frame are rectangular.

13. The apparatus of claim 12 wherein said means for expanding and contracting said frame comprises an expandable element disposed in each side of said rectangular frame.

14. The apparatus of claim 9 wherein said noise radiating element and said frame are circular.

15. The apparatus of claim 9 wherein said frame is resiliently mounted to said outer shroud.

16. The apparatus of claim 9 further comprising an actuator disposed on said noise radiating element.

17. The apparatus of claim 9 further comprising a plurality of noise radiating elements, each noise radiating element being enclosed in a frame mounted to said outer shroud, and each frame including a means for expanding and contracting said frame.

18. The apparatus of claim 17 wherein each one of said plurality of noise radiating elements is disposed inside said outer shroud.

19. The apparatus of claim 17 wherein a first portion of said plurality of noise radiating elements is located upstream of said fan, and a second portion of said plurality of noise radiating elements is located downstream of said fan.

20. The apparatus of claim 9 wherein said noise radiating element is disposed inside of said outer shroud near a sound port formed in said outer shroud.

21. A method for adjusting the resonant frequency of a noise radiating element used in an active noise cancellation system which minimizes noise emanating from an aircraft engine having an outer shroud and a fan, said method comprising the steps of:
   enclosing said noise radiating element in a frame;
   sensing the blade passage frequency of said fan; and
   changing the size of said frame in accordance with the blade passage frequency of said fan.

22. The method of claim 21 further comprising the step of sensing the displacement of said noise radiating element, said step of changing the size of said frame also being in accordance with the displacement of said noise radiating element.

* * * * *